United States Patent
Putnam

(10) Patent No.: US 10,878,421 B2
(45) Date of Patent: Dec. 29, 2020

(54) DATA VERIFIED DEPOSITS

(71) Applicant: Plaid Inc., San Francisco, CA (US)

(72) Inventor: Warren Lowell Putnam, New York, NY (US)

(73) Assignee: Plaid Inc., San Francisco, CA (US)

( * ) Notice: Subject to any disclaimer, the term of this patent is extended or adjusted under 35 U.S.C. 154(b) by 76 days.

(21) Appl. No.: 16/042,618

(22) Filed: Jul. 23, 2018

(65) Prior Publication Data

US 2019/0188717 A1 Jun. 20, 2019

Related U.S. Application Data

(60) Provisional application No. 62/535,860, filed on Jul. 22, 2017.

(51) Int. Cl.
| | |
|---|---|
| *G06Q 20/40* | (2012.01) |
| *G06Q 20/10* | (2012.01) |
| *G06Q 20/38* | (2012.01) |
| *G06Q 20/42* | (2012.01) |
| *G06Q 20/02* | (2012.01) |

(52) U.S. Cl.
CPC ....... *G06Q 20/4014* (2013.01); *G06Q 20/023* (2013.01); *G06Q 20/108* (2013.01); *G06Q 20/3821* (2013.01); *G06Q 20/42* (2013.01)

(58) Field of Classification Search
CPC .......... G06Q 20/4014; G06Q 20/3821; G06Q 20/42; G06Q 20/108; G06Q 20/023
See application file for complete search history.

(56) References Cited

U.S. PATENT DOCUMENTS

| | | | |
|---|---|---|---|
| 5,237,499 A | 8/1993 | Garback |
| 5,347,632 A | 9/1994 | Filepp |
| 5,634,127 A | 5/1997 | Cloud |
| 5,649,186 A | 7/1997 | Ferguson |
| 5,701,451 A | 12/1997 | Rogers |
| 5,710,884 A | 1/1998 | Dedrick |
| 5,710,918 A | 1/1998 | Lagarde |
| 5,721,908 A | 2/1998 | Lagarde |
| 5,727,159 A | 3/1998 | Kikinis |

(Continued)

FOREIGN PATENT DOCUMENTS

| | | |
|---|---|---|
| EP | 0 848 336 | 6/1998 |
| EP | 0 848 338 | 6/1998 |

(Continued)

OTHER PUBLICATIONS

U.S. Appl. No. 14/719,110, System and Method for Programmatically Accessing Financial Data, filed May 21, 2015.

(Continued)

*Primary Examiner* — Calvin L Hewitt, II
*Assistant Examiner* — Vincent I Idiake
(74) *Attorney, Agent, or Firm* — Knobbe Martens Olson & Bear LLP

(57) ABSTRACT

A system and method for verifying account ownership using verified deposits. An ACH verification platform may recognize or detect a verification process involving microdeposits. A verification platform may receive and store user login, initiate the deposits, and monitor the user's account to verify that posting of the deposits was successful. In embodiments, a dedicated web form or portal may be provided for receiving verification information.

5 Claims, 3 Drawing Sheets

(56) References Cited

U.S. PATENT DOCUMENTS

| | | |
|---|---|---|
| 5,745,754 A | 4/1998 | Lagarde |
| 5,752,246 A | 5/1998 | Rogers |
| 5,778,065 A | 7/1998 | Hauser et al. |
| 5,778,367 A | 7/1998 | Wesinger, Jr. et al. |
| 5,787,403 A | 7/1998 | Randle |
| 5,793,964 A | 8/1998 | Rogers |
| 5,813,007 A | 9/1998 | Nielsen |
| 5,815,665 A | 9/1998 | Teper |
| 5,819,284 A | 10/1998 | Farber |
| 5,835,724 A | 11/1998 | Smith |
| 5,838,910 A | 11/1998 | Domenikos et al. |
| 5,838,916 A | 11/1998 | Domenikos et al. |
| 5,845,073 A | 12/1998 | Carlin |
| 5,855,018 A | 12/1998 | Chor et al. |
| 5,862,325 A | 1/1999 | Reed et al. |
| 5,870,559 A | 2/1999 | Leshem et al. |
| 5,875,296 A | 2/1999 | Shi |
| 5,878,219 A | 3/1999 | Vance |
| 5,892,905 A | 4/1999 | Brandt et al. |
| 5,892,909 A | 4/1999 | Grasso |
| 5,898,836 A | 4/1999 | Freivald |
| 5,901,287 A | 5/1999 | Bull |
| 5,903,881 A | 5/1999 | Schrader |
| 5,908,469 A | 6/1999 | Botz |
| 5,913,214 A | 6/1999 | Madnick |
| 5,918,216 A | 6/1999 | Miksovsky et al. |
| 5,920,848 A | 7/1999 | Schutzer |
| 5,926,798 A | 7/1999 | Carter |
| 5,930,764 A | 7/1999 | Melchione et al. |
| 5,930,777 A | 7/1999 | Barber |
| 5,933,604 A | 8/1999 | Inakoshi |
| 5,933,816 A | 8/1999 | Zeanah |
| 5,956,720 A | 9/1999 | Fernandez et al. |
| 5,961,593 A | 10/1999 | Gabber et al. |
| 5,961,601 A | 10/1999 | Iyengar |
| 5,963,915 A | 10/1999 | Kirsch |
| 5,963,925 A | 10/1999 | Kolling |
| 5,966,967 A | 10/1999 | Agrawal |
| 5,978,828 A | 11/1999 | Greer |
| 5,978,842 A | 11/1999 | Noble |
| 5,983,267 A | 11/1999 | Shklar et al. |
| 5,983,268 A | 11/1999 | Freivald |
| 5,987,440 A | 11/1999 | O'Neil et al. |
| 5,987,454 A | 11/1999 | Hobbs |
| 5,995,943 A | 11/1999 | Bull |
| 5,999,971 A | 12/1999 | Buckland |
| 6,003,032 A | 12/1999 | Bunney et al. |
| 6,006,333 A | 12/1999 | Nielsen |
| 6,023,698 A | 2/2000 | Lavey |
| 6,041,362 A | 3/2000 | Mears et al. |
| 6,047,327 A | 4/2000 | Tso et al. |
| 6,055,570 A | 4/2000 | Nielsen |
| 6,078,929 A | 6/2000 | Rao |
| 6,082,776 A | 7/2000 | Feinberg |
| 6,092,196 A | 7/2000 | Reiche |
| 6,092,197 A | 7/2000 | Coueignoux |
| 6,105,131 A | 8/2000 | Carroll |
| 6,119,101 A | 9/2000 | Peckover |
| 6,138,158 A | 10/2000 | Boyle |
| 6,148,337 A | 11/2000 | Estberg et al. |
| 6,151,581 A | 11/2000 | Kraftson et al. |
| 6,151,601 A | 11/2000 | Papierniak |
| 6,182,142 B1 | 1/2001 | Win |
| 6,185,567 B1 | 2/2001 | Ratnaraj et al. |
| 6,195,698 B1 | 2/2001 | Lillibridge et al. |
| 6,199,077 B1 | 3/2001 | Inala |
| 6,205,433 B1 | 3/2001 | Boesch |
| 6,208,975 B1 | 3/2001 | Bull |
| 6,209,007 B1 | 3/2001 | Kelley et al. |
| 6,243,816 B1 | 6/2001 | Fang et al. |
| 6,246,999 B1 | 6/2001 | Riley et al. |
| 6,278,449 B1 | 8/2001 | Sugiarto et al. |
| 6,278,999 B1 | 8/2001 | Knapp |
| 6,292,789 B1 | 9/2001 | Schutzer |
| 6,297,819 B1 | 10/2001 | Furst |
| 6,301,584 B1 | 10/2001 | Ranger |
| 6,308,203 B1 | 10/2001 | Itabashi et al. |
| 6,311,275 B1 | 10/2001 | Jin et al. |
| 6,317,783 B1 | 11/2001 | Freishtat |
| 6,360,205 B1 | 3/2002 | Iyengar |
| 6,366,933 B1 | 4/2002 | Ball et al. |
| 6,401,118 B1 | 6/2002 | Thomas |
| 6,405,245 B1 | 6/2002 | Burson |
| 6,412,073 B1 | 6/2002 | Rangan |
| 6,424,968 B1 | 7/2002 | Broster |
| 6,430,539 B1 | 8/2002 | Lazarus |
| 6,484,155 B1 | 11/2002 | Kiss |
| 6,499,042 B1 | 12/2002 | Markus |
| 6,510,451 B2 | 1/2003 | Wu |
| 6,567,411 B2 | 5/2003 | Dahlen |
| 6,567,850 B1 | 5/2003 | Freishtat |
| 6,594,766 B2 | 7/2003 | Rangan |
| 6,632,248 B1 | 10/2003 | Isaac et al. |
| 6,633,910 B1 | 10/2003 | Rajan |
| 6,631,402 B1 | 11/2003 | Devine |
| 6,725,200 B1 | 4/2004 | Rost |
| 6,802,042 B2 | 10/2004 | Rangan |
| 6,859,931 B1 | 2/2005 | Cheyer et al. |
| 6,957,199 B1 | 10/2005 | Fisher |
| 7,028,049 B1 | 4/2006 | Shelton |
| 7,072,932 B1 | 7/2006 | Stahl |
| 7,092,913 B2 | 8/2006 | Cannon, Jr. |
| 7,200,578 B2 | 4/2007 | Paltenghe et al. |
| 7,263,548 B2 | 8/2007 | Daswani |
| 7,275,046 B1 | 9/2007 | Tritt et al. |
| 7,340,411 B2 | 3/2008 | Cook |
| 7,424,520 B2 | 9/2008 | Daswani |
| 7,752,535 B2 | 7/2010 | Satyavolu |
| 8,006,291 B2 | 8/2011 | Headley et al. |
| 8,010,783 B1 | 8/2011 | Cahill |
| 8,145,914 B2 | 3/2012 | Steeves |
| 8,166,562 B2 | 4/2012 | Holvey et al. |
| 8,266,515 B2 | 9/2012 | Satyavolu |
| 8,613,066 B1 | 12/2013 | Brezinski et al. |
| 8,645,264 B2 | 2/2014 | Allison et al. |
| 8,676,611 B2 | 3/2014 | McLaughlin et al. |
| 8,739,260 B1 | 5/2014 | Damm-Goossens |
| 9,106,642 B1 | 8/2015 | Bhimanail |
| 9,430,892 B2 | 8/2016 | Amdahl |
| 9,449,346 B1 | 9/2016 | Hockey et al. |
| 9,595,023 B1 | 3/2017 | Hockey et al. |
| 9,699,187 B2 | 7/2017 | Chen et al. |
| 9,774,590 B1 | 9/2017 | Bronshtein et al. |
| 9,906,520 B2 | 2/2018 | Fouad et al. |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,523,653 B2 | 12/2019 | Hockey et al. |
| 10,530,761 B2 | 1/2020 | Hockey et al. |
| 10,614,463 B1 | 4/2020 | Hockey et al. |
| 2001/0011274 A1 | 8/2001 | Klug et al. |
| 2002/0002596 A1 | 1/2002 | Sugiarto et al. |
| 2002/0065772 A1 | 5/2002 | Saliba et al. |
| 2002/0091635 A1* | 7/2002 | Dilip .................. G06Q 20/10 705/39 |
| 2002/0095588 A1 | 7/2002 | Shigematsu et al. |
| 2003/0023879 A1 | 1/2003 | Wray |
| 2003/0028646 A1 | 2/2003 | Wray |
| 2003/0060896 A9 | 3/2003 | Hulai |
| 2003/0163425 A1 | 8/2003 | Cannon, Jr. |
| 2003/0182035 A1 | 9/2003 | DiLodovico et al. |
| 2003/0185370 A1 | 10/2003 | Rosera |
| 2003/0204460 A1 | 10/2003 | Robinson |
| 2005/0027617 A1 | 2/2005 | Zucker et al. |
| 2005/0154913 A1 | 7/2005 | Barriga et al. |
| 2005/0222929 A1 | 10/2005 | Steier et al. |
| 2005/0246269 A1 | 11/2005 | Smith |
| 2006/0015358 A1 | 1/2006 | Chua |
| 2006/0190569 A1 | 8/2006 | Neil |
| 2006/0236384 A1 | 10/2006 | Lindholm et al. |
| 2007/0179942 A1 | 8/2007 | Heggem |
| 2007/0225047 A1 | 9/2007 | Bakos |
| 2007/0255662 A1 | 11/2007 | Tumminaro |
| 2007/0289002 A1 | 12/2007 | van der Horst et al. |

(56) References Cited

U.S. PATENT DOCUMENTS

| | | |
|---|---|---|
| 2008/0051059 A1 | 2/2008 | Fisher |
| 2008/0052192 A1 | 2/2008 | Fisher |
| 2008/0052233 A1 | 2/2008 | Fisher |
| 2008/0162361 A1 | 7/2008 | Sklovsky |
| 2008/0183628 A1 | 7/2008 | Oliver et al. |
| 2008/0243784 A1 | 10/2008 | Stading |
| 2009/0037308 A1 | 2/2009 | Feinstein |
| 2009/0070257 A1 | 3/2009 | Csoka |
| 2009/0222900 A1 | 9/2009 | Benaloh et al. |
| 2009/0228779 A1 | 9/2009 | Williamson et al. |
| 2009/0245521 A1 | 10/2009 | Vembu |
| 2009/0271847 A1 | 10/2009 | Karjala et al. |
| 2009/0328177 A1 | 12/2009 | Frey et al. |
| 2010/0027552 A1 | 2/2010 | Hill |
| 2010/0049850 A1 | 2/2010 | Nanduri et al. |
| 2010/0185868 A1 | 7/2010 | Grecia |
| 2010/0235882 A1 | 9/2010 | Moore |
| 2010/0313255 A1 | 12/2010 | Khuda |
| 2011/0196790 A1 | 8/2011 | Milne |
| 2011/0238550 A1 | 9/2011 | Reich et al. |
| 2011/0295731 A1 | 12/2011 | Waldron, III et al. |
| 2012/0129503 A1 | 5/2012 | Lindeman et al. |
| 2012/0209775 A1 | 8/2012 | Milne |
| 2012/0278201 A1 | 11/2012 | Milne |
| 2012/0281058 A1 | 11/2012 | Laney et al. |
| 2013/0019297 A1 | 1/2013 | Lawson et al. |
| 2013/0125223 A1 | 5/2013 | Sorotokin et al. |
| 2013/0174015 A1 | 7/2013 | Jeff |
| 2013/0247005 A1 | 9/2013 | Hirsch et al. |
| 2013/0282577 A1 | 10/2013 | Milne |
| 2013/0318592 A1 | 11/2013 | Grier, Sr. et al. |
| 2014/0032414 A1 | 1/2014 | Beisner et al. |
| 2014/0040148 A1 | 2/2014 | Ozvat et al. |
| 2014/0044123 A1 | 2/2014 | Lawson et al. |
| 2014/0150072 A1 | 5/2014 | Castro et al. |
| 2014/0165156 A1 | 6/2014 | Fushman et al. |
| 2014/0180962 A1 | 6/2014 | Fiala et al. |
| 2014/0189808 A1 | 7/2014 | Mahaffey et al. |
| 2014/0215551 A1 | 7/2014 | Allain et al. |
| 2014/0245411 A1 | 8/2014 | Meng et al. |
| 2014/0258063 A1 | 9/2014 | Chourasia et al. |
| 2014/0365350 A1 | 12/2014 | Shvarts |
| 2015/0026024 A1 | 1/2015 | Calman et al. |
| 2015/0046338 A1 | 2/2015 | Laxminarayanan et al. |
| 2015/0066719 A1 | 3/2015 | Agrawal et al. |
| 2015/0088707 A1 | 3/2015 | Drury et al. |
| 2015/0113511 A1 | 4/2015 | Poulin |
| 2015/0161608 A1 | 6/2015 | Gilbert |
| 2015/0254672 A1 | 9/2015 | Huesch et al. |
| 2015/0281225 A1 | 10/2015 | Schoen et al. |
| 2015/0365399 A1 | 12/2015 | Biswas et al. |
| 2016/0063657 A1 | 3/2016 | Chen et al. |
| 2017/0200234 A1 | 7/2017 | Morse |
| 2018/0367428 A1 | 12/2018 | Di Pietro et al. |
| 2020/0106764 A1 | 4/2020 | Hockey et al. |
| 2020/0106765 A1 | 4/2020 | Hockey et al. |

FOREIGN PATENT DOCUMENTS

| | | |
|---|---|---|
| EP | 0 848 339 | 6/1998 |
| EP | 2 747 374 | 6/2014 |
| EP | 3 347 846 | 7/2018 |
| WO | WO 96/38795 | 12/1996 |
| WO | WO 97/10542 | 3/1997 |
| WO | WO 97/09682 | 5/1997 |
| WO | WO 97/26612 | 7/1997 |
| WO | WO 97/37314 | 10/1997 |
| WO | WO 98/14896 | 4/1998 |
| WO | WO 00/25227 | 5/2000 |
| WO | WO 2017/044479 | 3/2017 |

OTHER PUBLICATIONS

U.S. Appl. No. 16/396,505, System and Method for Programmatically Accessing Financial Data, filed Apr. 26, 2019.
U.S. Appl. No. 14/719,117, System and Method for Facilitating Programmatic Verification of Transactions, filed May 21, 2015.
U.S. Appl. No. 16/800,543, System and Method for Facilitating Programmatic Verification of Transactions, filed Feb. 25, 2020.
U.S. Appl. No. 16/688,192, Secure Permissioning of Access to User Accounts, Including Secure Deauthorization of Access to User Accounts, filed Nov. 19, 2019.
U.S. Appl. No. 16/688,263, Secure Permissioning of Access to User Accounts, Including Secure Deauthorization of Access to User Accounts, filed Nov. 19, 2019.
U.S. Appl. No. 15/159,714, Parameter-Based Computer Evaluation of User Accounts Based on User Account Data Stored in One or More Databases, filed May 19, 2016.
U.S. Appl. No. 16/900,052, Parameter-Based Computer Evaluation of User Accounts Based on User Account Data Stored in One or More Databases, filed Jun. 12, 2020.
U.S. Appl. No. 15/160,663, Systems and Methods for Estimating Past and Prospective Attribute Values Associated With a User Account, filed May 20, 2016.
U.S. Appl. No. 16/570,630, Secure Authorization of Access to User Accounts by One or More Authorization Mechanisms, filed Sep. 13, 2019.
U.S. Appl. No. 16/042,147, Browser-Based Aggregation, filed Jul. 23, 2018.
"A Single Login Web Service Integrator—WebEntrance", Yan Zhao, Sixth International World Wide Web Conference, Santa Clara, CA, Apr. 7-11, 1997.
"Automatic Notification of Web Sites Changes," Google Groups, Aug. 30, 1995.
"Boeing Chooses NetMind Enterprise Minder to Help Thousands of Employees Track Web-Based Information," PR Newswire, Nov. 19, 1998.
"Caravelle's InfoWatcher 1.1 Keeps an Eye on the Web," PC Week 1997.
"Cognisoft Announces IntelliServ, A Revolutionary Intranet Information Management Application; a Powerful Solution that Enables the Right Information to Find the Right User at the Right Time," Business Wire, p. 8140125, Aug. 14, 1996.
"FirstFloor and AirMedia Announce Partnership," Business Wire 1997 ("FirstFloor").
"Fujitsu Announces 'WebAgent' Application as part of ByeDesk Link Wireless Server Software," Business Wire, Sep. 1, 1998.
"Fujitsu Announces Availability of ByeDesk Link for Alpha-Numeric Pagers; Next Step in Empowering Mobile Workforces with 'Anyplace, Anytime' Information," Business Wire, Jul. 9, 1998.
"Fujitsu Picks NetMind for Wireless Web Agent Software," Computergram International, Sep. 2, 1998.
"Fujitsu's ByeDesk Link Now Available on the PalmPilot," Business Wire, Sep. 21, 1998.
"GC Tech's GlobeID Payment Internet Commerce Software Supports Microsoft, Merchant Server," Business Wire, Jan. 21, 1997, p. 1211286.
"Highly Scalable On-Line Payments via Task Decoupling," Financial Cryptography First International Conference, 1998, p. 355-373.
"Minding Web Site Changes," PC Week, Sep. 14, 1998.
"NetMind Accepts $7 Million Strategic Investment From Three Prominent VC Firms—BancBoston, Softbank and Draper Fisher Jurvestson," PR Newswire, Nov. 6, 1998.
"NetMind Updates the World's Largest Free Web Tracking Service," PR Newswire, Sep. 18, 1998.
"The AT&T Internet Difference Engine: Tracking and Viewing Changes on the Web," World Wide Web 1 (1); Jan. 1998, pp. 27-44.
"Versatile Intelligent Agents in Commercial Applications," Google Groups, Dec. 12, 1998.
"Web Interface Definition Language (WIDL)", W3 Consortium submission from webMethods, Inc., Sep. 22, 1997.
"WebEntree: A Web Service Aggregator", Y. Zhao, IBM Systems Journal, vol. 37, No. 4, 1998.
A hierarchical approach to wrapper induction, Ion Muslea, Steve Minton, and Craig A. Knoblock. In Proceedings of the 3rd International Conference on Autonomous Agents 1999, Seattle, WA, 1999. May 1-5, 1999.

(56) References Cited

OTHER PUBLICATIONS

Building agents for internet-base supply chain integration, Craig A. Knoblock and Steven Minton. In Proceedings of the Workshop on Agents for Electronic Commerce and Managing the Internet-Enabled Supply Chain, Seattle, WA, 1999. May 1-5, 1999.

Corena et al., "Secure and fast aggregation of financial data in cloud-based expense tracking applications." Journal of Network and Systems Management 20.4 (2012): 534-560.

Hagel et al. "The Coming Battle for Customer Information." Harvard Business Review, Jan.-Feb. 1997, reprint No. 97104.

Hummer, Waldemar, Philipp Leitner, and Schahram Dustdar. "Ws-aggregation: distributed of web services data." Proceedings of the 2011 ACM Symposium on Applied Computing. ACM, 2011.

Intelligent caching for information mediators: A kr based approach, Naveen Ashish, Craig A. Knoblock, and Cyrus Shahabi. In Proceedings of the Workshop on Knowledge Representation meets Databases (KRDB), Seattle, WA, 1998. Presented May 1, 1998.

Johner et al. "Sign On with IBM's Global Sign-On!" IBM manual, Nov. 1998. Part 1, in 184 pages.

Johner et al. "Sign On with IBM's Global Sign-On!" IBM manual, Nov. 1998. Part 2, pp. 166-307.

Kim, Young-Gon et. al., 'A Design of User Authentication System Using QR code Identifying Method', 6th International Conference on Computer Sciences and Convergence Information Technology (ICCIT), pp. 31-35, 2011.

Kyeongwon C., et. al., 'A Mobile based Anti-Phishing Authentication Scheme using QR code', IEEE International Conference on Mobile IT Convergence, pp. 109-113, 2011.

Mancini et al., "Simulation in the Cloud Using Handheld Devices," Workshop on Modeling and Simulation on Grid and Cloud Computing, Apr. 25, 2012, 8 pages.

Modeling web sources for information integration, Craig A. Knoblock, Steven Minton, Jose Luis Ambite, Naveen Ashish, Pragnesh Jay Modi, Ion Muslea, Andrew G. Philpot, and Sheila Tejada. In Proceedings of the Fifteenth National Conference on Artificial Intelligence, Madison, WI, 1998. Jul. 26-30, 1998.

Mohammed et al. A Multi-layer of Multi Factors Authentication Model for Online Banking Services, Oct. 15, 2013, 2013 International Conference on Computing, Electrical and Electronic Engineering (ICCEEE), pp. 220-224.

Neville, S.W. et al. Efficiently Archieving Full Three-Way Non-repudiation in Consumer-level eCommerce and M-Commerce Transactions, Nov. 1, 2011, 2011 IEEE 10th International Conference on Trust, Security and Privacy in Computing and Communications, pp. 664-672.

Optimizing Information Agents by Selectively Materializing Data, Naveen Ashish, Craig A. Knoblock, and Cyrus Shahabi. In Proceedings of the AAAI'98 Workshop on AI and Information Integration, Madison, WI, 1998. Jul. 26-30, 1998.

O'Riain et al., "XBRL and open data for global financial ecosystems: A linked data approach." International Journal of Accounting Information Systems 13.2 (2012): 141-162.

Quwaider et al., "Experimental Framework for Mobile Cloud Computing System", Jordan University of Science and Technology, Procedia Computer Science 52, 2015, pp. 1147-1152.

Semi-automatic wrapper generation for Internet information sources, Naveen Ashish and Craig A. Knoblock. In Proceedings of the Second IFCIS International Conference on Cooperative Information Systems, Kiawah Island, SC, 1997. Jun. 24-27, 1997.

Sunwoo et al., "A Structured Approach to the Simulation, Analysis and Characterization of Smartphone Applications", IEEE 2013, pp. 113-122.

The ariadne approach to web-based information integration, Craig A. Knoblock and Steven Minton. IEEE Intelligent Systems, 13(5), Sep./Oct. 1998.

Wrapper generation for semi-structured Internet sources, Naveen Ashish and Craig A. Knoblock. In Proceedings of the Workshop on Management of Semistructured Data, Tucson, AZ, 1997. May 13-15, 1997.

Wrapper induction for semistructured, web-based information sources, Ion Muslea, Steven Minton, and Craig A. Knoblock. In Proceedings of the Conference on Automated Learning and Discovery Workshop on Learning from Text and the Web, Pittsburgh, PA, 1998. Jun. 11-13, 1998.

International Search Report in PCT Application No. PCT/US2016/050536, dated Dec. 15, 2016.

Supplementary European Search Report in EP Application No. 16844973.4, dated Jan. 4, 2019.

Examination Report in CA Application No. 2997115, dated Jun. 20, 2019.

Examination Report in CA Application No. 2997115, dated Nov. 13, 2019.

Examination Report in CA Application No. 2997115 dated Apr. 2, 2020.

\* cited by examiner

DATA VERIFIED DEPOSITS

PRIORITY CLAIM

This application claims priority to U.S. Patent Application No. 62/535,860, filed Jul. 22, 2017 and titled, "DATA VALIDATED DEPOSITS," the contents of which is incorporated by reference in its entirety.

BACKGROUND

NACHA, previously known as the National Automated Clearinghouse Association, recommends that account ownership be verified prior to initiating ACH transfers to or from customer accounts. Trial deposits are widely viewed as the safest and most effective way to verify account ownership, but they provide a poor customer experience and have ongoing limitations.

Traditional trial deposit methods require a customer to submit their account number and routing number to a service provider. The service provider then makes one (or several) small "random" deposits into the customer's account based on the information provided. The customer then checks the amounts of the deposits made by the service provider when they are posted to their account, which typically takes one to two business days. The customer then verifies the amounts back to the service provider, proving that they have access to the account.

However, these trial deposits are often unattractive to consumers, who are required take multiple steps, i.e., initiating the trial deposit, verifying multiple times that the deposit has been made, and then verifying the deposit back to the merchant or financial institution. Multi-step verification can also reduce the success verification rate, which can lead to lost opportunities for service providers.

Accordingly, there is a need for an account verification system that reliably permits verification with a single user action, obviating the need for the user to return to the service provider to verify deposits.

There is a further need for an account verification system that enables verification of an account held by a financial institution that is unable or unwilling to provide account numbers through their client web portals.

BRIEF DESCRIPTION OF THE DRAWINGS

The features and advantages of the present disclosure will be more fully understood with reference to the following detailed description when taken in conjunction with the accompanying figures, wherein.

SUMMARY

In embodiments of the invention a method is described comprising the steps of associating a customer account to a third-party service provider; receiving, during associating of the customer account, at least one credential; retrieving, after associating of the customer account, account data for the customer account; initiating a trial deposit to the customer account; retrieving ongoing data about the customer account directly from the financial institution, including the current balance and transactions data; and verifying, upon identifying the trial deposit, the customer account.

In further embodiments of the invention, a non-transitory computer-readable medium is described, having stored thereon, computer-executable instructions that, if executed by a computing device, cause the computing device to perform a method comprising the steps of associating a customer account to a third-party service provider; receiving, during associating of the customer account, at least one account verification credential; retrieving, after associating of the customer account, account data for the customer account; initiating a trial deposit to the customer account; retrieving ongoing data about the customer account directly from the financial institution, including the current balance and transactions data; and verifying, upon identifying the trial deposit, the customer account.

In still further embodiments, a data verification deposit system is described comprising at least one user computing device comprising a processor, memory, and storage, configured to initiate associating a customer account to a third-party service provider, the customer account associated with a financial institution, The data verification system may further include a server computing device configured to receive at least one account verification credential and to retrieve, after associating of the customer account, account data for the customer account directly from the financial institution. In embodiments, the server computing device is further configured to initiate a trial deposit to the customer account, to retrieve ongoing data about the customer account directly from the financial institution, and to verify, upon identifying the trial deposit, the customer account.

In embodiments, the customer account is an account associated with a financial institution, and the account data is retrieved directly from the financial institution. In embodiments, at least one account verification credential includes the customer's account number and routing number or the customer's user ID and password.

In embodiments, the account data for the customer account includes the current balance or transaction data.

DETAILED DESCRIPTION

In embodiments of the invention, a system and method is provided for customer accounts to be verified with a single user action minimizing the need for the customer to return to the service provider to verify the deposit amounts.

Figure 1:
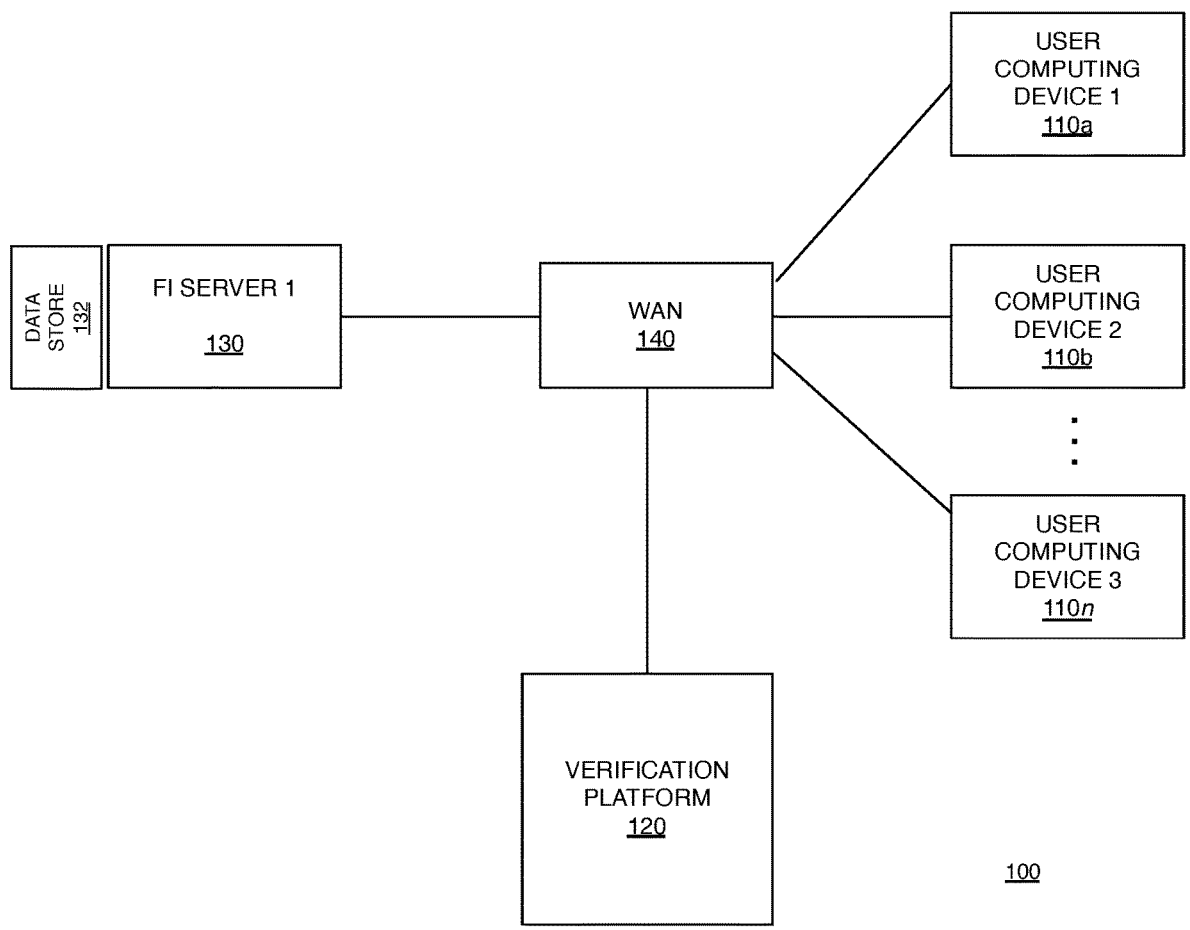
FIG. 1 is a logical block diagram describing a preferred embodiment of the present invention.

Referring to FIG. 1, a logical block diagram is shown describing a preferred embodiment of the present invention. One or more user computing devices 110a . . . 110n may be in communication with a verification platform 120 via a wide-area network such as the Internet. A financial institution web site 130 may be associated with a financial institution data store 132 via a network link such as a local area network 140. Financial institution website 130 may similarly be in communication with the verification platform 120 via a wide-area network such as the Internet.

In embodiments, verification platform 120 functions as a bridge or gateway between the user computing devices 110a . . . 110n and the financial institution web site 130 (and associated a financial institution data store 132) to facilitate account verification with minimized user involvement.

FIG. 1 illustrates just one example of a logical framework that may be used, and those of skill in the art will appreciate that the specific implementation is secondary to the functionality that the system components provide.

Process Flow

Figure 2:
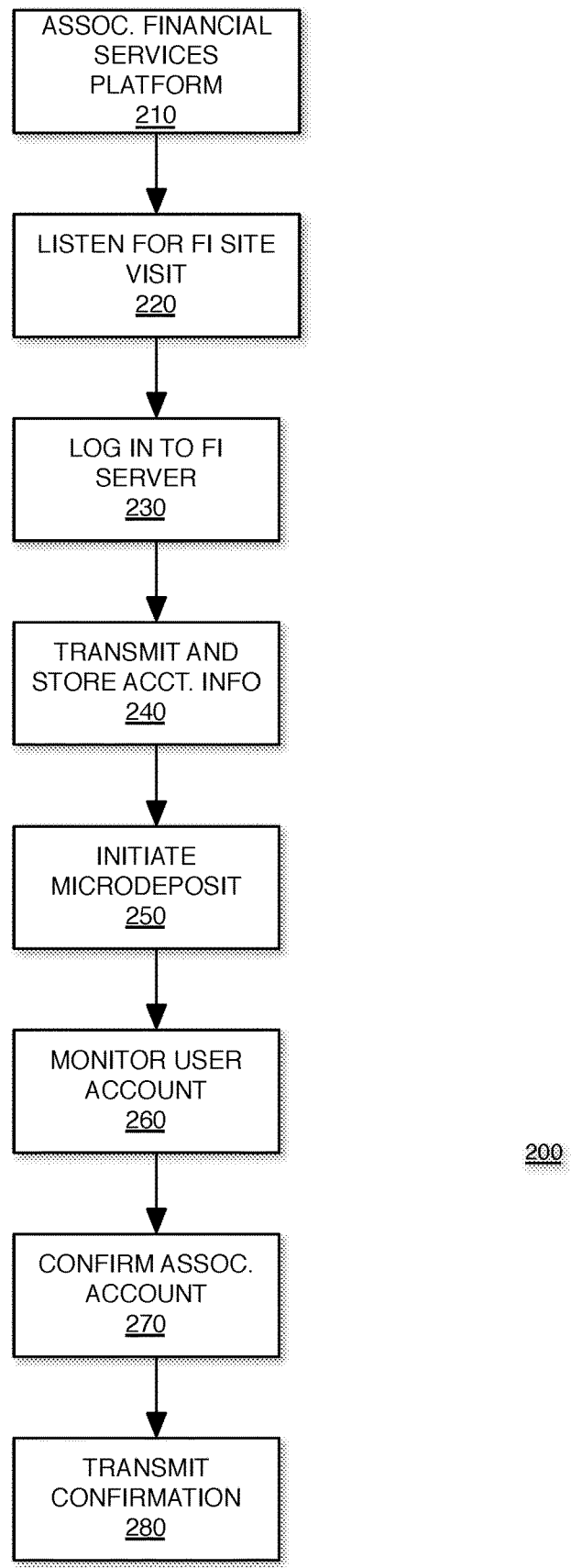
FIG. 2 is a process diagram describing the steps in an exemplary embodiment of the present invention.

Referring to FIG. 2, a process diagram is shown describing the steps in an exemplary embodiment of the present invention.

In a preferred embodiment, a user initiates (210) a process that requires verifying the user's external account so that the account is associated with the financial services platform. Certain financial services platforms (e.g., PayPal, Venmo, bank bill pay, loan payments, etc.) may permit ACH payments, deposits, or withdrawals to or from an external account, often only after the user verifies the external account. In embodiments, during the verification process the user may be requested to enter their login credentials for the financial services provider holding the account to be associated, along with the account number and routing number.

In embodiments, the user computing device or the verification platform may recognize or detect (220) a verification request that initiates the verification process of the present invention. In embodiments, the financial institution web site may use a specially configured form to initiate the verification process of the present invention. In still further embodiments a browser plugin, system service, web widget, or even a dedicated mobile app may trigger the verification process. In embodiments, an API may be provided to provide a connection between the financial services provider and the verification platform of the present invention.

A user may then log in (230) to the financial institution web site per usual, with the user's normal login credentials. The user's login credentials and/or banking information such as account and routing number may then be transmitted (240) to the verification platform for storage.

The verification platform may then take steps to verify the user's account using the saved login credentials. In embodiments, the verification platform may initiate a trial deposit (250) using the account and routing numbers gathered from the user.

The verification platform may then monitor the user's financial services account by logging in on a periodic basis and verifying (260) the user's transaction history. When the microdeposit made in the prior step is identified as cleared, the verification platform may then verify (270) the account.

The account verification may then be transmitted (280) to the user computing device or financial services provider.

In embodiments, account aggregation may also be used to limit user involvement in the verification process. For example, in some cases a financial institution may permit account and routing numbers to be retrieved upon authenticating user credentials via a financial institution's client web portal. However, for cases where user credentials provide access to financial institution data, but do not permit retrieval of account and routing number information, the verification method described herein may be utilized.

System Architecture

Figure 3:
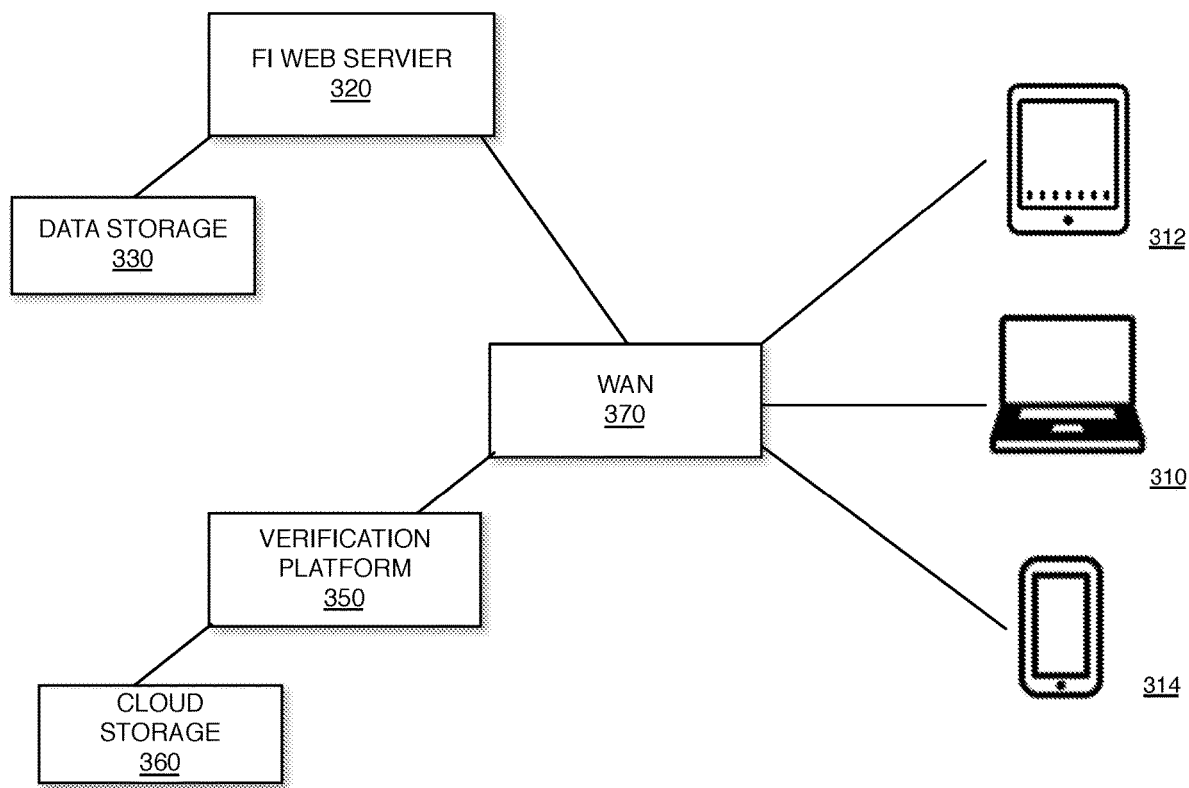
FIG. 3 is a block diagram describing an exemplary system architecture that may be used to implement one or more illustrative aspects described herein.

FIG. 3 describes an exemplary system architecture that may be used to implement one or more illustrative aspects described herein. Computer software, hardware, and networks may be utilized in a variety of different system environments, including standalone, networked, remote-access, virtualized, and/or cloud-based environments, among others.

In embodiments, a user may engage with the system via one or more user computing devices connected to the network. Referring to FIG. 3, exemplary computing devices may include personal computer 310. In embodiments other computing devices may be utilized —alternatively or in concert—including tablet computer 312, mobile device 314, and similar devices.

In embodiments, computing device 310 may be a personal computer, a server, a network router, switch or bridge, virtual assistant (e.g., Amazon Alexa, Google Home, Apple HomePod), digital media player (e.g., Amazon Fire, AppleTV, Roku, Google Chromecast, Roku), smartwatch, a set-top box (STB), gaming system, or any machine capable of executing a set of instructions (sequential or otherwise) that specify actions to be taken by that computing device.

While only a collection of computing devices are illustrated, the term "computing device" should be taken to include any collection of computing devices that individually or jointly execute a set (or multiple sets) of instructions to perform any one or more of the methodologies discussed herein.

In embodiments, the computing device may be connected (e.g., networked) to other machines in a LAN, an intranet, an extranet, a WiFi network, a cellular network, or the Internet (WAN) 470. In embodiments, computing device 310 (and also 312, 314) may be provided with a web browser for facilitating connections over the network.

In embodiments of the present invention, a browser plugin may be provided on computing device 310 to carry out the steps described in FIGS. 2-3. The term "plugin" refers to any software component that extends the functionality of the user's existing system.

In further embodiments, computing device 310 may be provided with an app that implements the methodologies discussed herein. In embodiments of the invention, a software development kit ("SDK") may be provided to facilitate development of mobile apps (or other software) to run operate with the system of the present invention.

In embodiments, the system of the present invention may include one or more web servers 320, each connected to a financial information database or data storage device 330. In embodiments, the computing device may be connected (e.g., networked) to other machines in the same manner as the computing device 310 (and also 312, 314), namely, in a LAN, an intranet, an extranet, a WiFi network, a cellular network, or the Internet.

In embodiments, the system of the present invention may include a verification platform server 350 and associated cloud storage 360. The verification platform server 350 may contain code that implements the synchronization steps shown in FIG. 2 discussed herein. Cloud storage 360 may be a data storage device, which can be configured as a server computing service, for receiving user data during synchronization. Synchronizations server 360 may be function as an intermediary system between a user and financial institution, and coordinate the steps of accessing, storing, and processing user FI data.

As shown in FIG. 3, various nodes including those associated with a network—including 310, 320, 330, 340—may be interconnected using a wide area network (WAN) 370, such as the Internet. Other networks may also or alternatively be used, including private intranets, corporate networks, LANs, metropolitan area networks (MAN) wireless networks, personal networks (PAN), and the like. Network 370 is for illustration purposes and may be replaced with fewer or additional computer networks. A local area network (LAN) may have one or more of any known LAN topology and may use one or more of a variety of different protocols, such as Ethernet. Devices—including 310, 312, 314—may be connected to one or more of the networks via ethernet cable, coaxial cable, fiber optic cable, wireless communication protocols utilizing radio waves (including, e.g., WiFi and Bluetooth), or other communication media.

It will be understood that the term "network" refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

It will be understood by those of ordinary skill in the art that computing devices, server computing devices, and data storage may be combined on the same physical machines, and retain separate virtual or logical addresses, or may reside on separate physical machines. FIG. 3 illustrates just one example of a network architecture that may be used, and those of skill in the art will appreciate that the specific network architecture and data processing devices used may vary, and are secondary to the functionality that they provide, as further described herein. For example, services provided by web server 320 and data server 330 may be combined on a single server.

Each component node on the network may be any type of known computer, server, or data processing device. User computing devices and servers may include a processor controlling overall operation of the computing device or server. These devices may further include random access memory (RAM), read-only memory (ROM), network interface, input/output interfaces (e.g., keyboard, touchscreen, mouse, display, printer, etc.), and memory.

Memory may also store data used in performance of one or more aspects described herein, including the databases associated with the servers discussed herein. Information can be stored in a single database, or separated into different logical, virtual, or physical databases, depending on system design. Those of skill in the art will appreciate that the functionality of user computing devices and servers described herein may be spread across multiple data processing devices, for example, to distribute processing load across multiple computers, to segregate transactions based on geographic location, user access level, quality of service, etc.

One or more aspects may be embodied in computer-usable or readable data and/or computer-executable instructions, such as in one or more program modules, executed by one or more computers or other devices as described herein. Generally, program modules include routines, programs, objects, components, data structures, etc., that perform particular tasks or implement particular abstract data types when executed by a processor in a computer or other device. The modules may be written in a source code programming language that is subsequently compiled for execution, or may be written in a scripting language such as (but not limited to) scripting or markup languages. The computer-executable instructions may be stored on a computer-readable medium such as a nonvolatile storage device. Any suitable computer-readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer-executable instructions and computer-usable data described herein.

Although the foregoing invention has been described in detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

I claim:

1. A system comprising:
a financial institution computing device comprising:
a first one or more processors; and
a first memory storing executable instructions that when executed by the first one or more processors cause the first one or more processors to perform the method of:
receiving, from a user, and storing account login credentials associated with a user account;
verifying, using the account login credentials, the user account; and
providing the account login credentials to the verification platform computing device; and
a verification platform computing device comprising:
a second one or more processors; and
a second memory storing executable instructions that when executed by the second one or more processors cause the second one or more processors to perform the method of:
receiving the account login credentials from the financial institution computing device;
obtaining, by accessing the user account using the account login credentials and via the financial institution computing device, an account number and a routing number associated with the user account;
depositing an amount to the user account using the account number and the routing number;
monitoring the user account using the account login credentials and via the financial institution computing device, wherein monitoring the user account comprises periodically accessing the user account and obtaining a transaction history of the user account;
identifying, from the transaction history of the user account, the deposit amount; and
in response to identifying the deposit amount, verifying the user account.

2. The system of claim 1, wherein the verifying of the user account comprises verifying the user account via at least one of: a browser plugin, system service, web widget, or mobile application.

3. The system of claim 1, wherein monitoring the user account is accomplished via an application programming interface.

4. The system of claim 1, wherein the executable instructions stored in the second memory, when executed by the second one or more processors, cause the second one or more processors to further perform the method of:
storing the account login credentials.

5. The system of claim 1, wherein the executable instructions stored in the second memory, when executed by the second one or more processors, cause the second one or more processors to further perform the method of:

transmitting an indication of verification of the user account to a user computing device or the financial institution computing device.

\* \* \* \* \*